United States Patent
Fan et al.

(10) Patent No.: US 10,162,223 B2
(45) Date of Patent: Dec. 25, 2018

(54) LIQUID CRYSTAL DISPLAY AND MANUFACTURING METHOD THEREOF

(71) Applicants: BOE Technology Group Co., Ltd., Beijing (CN); Beijing BOE Optoelectronics Technology Co., Ltd., Beijing (CN)

(72) Inventors: Yuguang Fan, Beijing (CN); Jingpeng Li, Beijing (CN); Wei Sun, Beijing (CN); Yan Yang, Beijing (CN); Shichao Wang, Beijing (CN); Yuekai Gao, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/505,033

(22) PCT Filed: Jul. 26, 2016

(86) PCT No.: PCT/CN2016/091729
§ 371 (c)(1),
(2) Date: Feb. 17, 2017

(87) PCT Pub. No.: WO2017/063426
PCT Pub. Date: Apr. 20, 2017

(65) Prior Publication Data
US 2017/0276991 A1    Sep. 28, 2017

(30) Foreign Application Priority Data
Oct. 16, 2015  (CN) .......................... 2015 1 0673647

(51) Int. Cl.
*G02F 1/1333*   (2006.01)
*G02F 1/1339*   (2006.01)
*G02F 1/133*    (2006.01)
*G02F 1/1335*   (2006.01)
(Continued)

(52) U.S. Cl.
CPC ........ *G02F 1/13394* (2013.01); *G02F 1/1339* (2013.01); *G02F 1/1345* (2013.01);
(Continued)

(58) Field of Classification Search
CPC ............. G02F 1/13394; G02F 1/13306; G02F 1/133514; G02F 1/133516; G02F 1/1362; G02F 2001/13396
See application file for complete search history.

(56) References Cited

U.S. PATENT DOCUMENTS

2005/0243261 A1* 11/2005 Chiang ............. G02F 1/133514
                                                     349/155
2006/0081846 A1*  4/2006 Yamazaki ........... G02F 1/13454
                                                     257/59
2006/0262265 A1* 11/2006 Lee ....................... G02F 1/1339
                                                     349/155

FOREIGN PATENT DOCUMENTS

CN         1696776 A    11/2005
CN       103268037 A     8/2013
(Continued)

OTHER PUBLICATIONS

Oct. 28, 2016—(WO) International Search Report and Written Opinion Appn PCT/CN2016/091729 with English Tran.
(Continued)

*Primary Examiner* — Nathanael R Briggs
(74) *Attorney, Agent, or Firm* — Banner & Witcoff, Ltd.

(57) ABSTRACT

A liquid crystal display (LCD) and a manufacturing method thereof. The liquid crystal display (LCD), having a display area (AA) and a border area (BB), includes: an array substrate and a color filter (CF) substrate arranged opposite to each other; and a plurality of primary spacers disposed between the array substrate and the CF substrate. A circuit board is bonded to an edge of the array substrate. The LCD comprises a distribution change area (CC) which is disposed
(Continued)

at a periphery of the circuit board; and a distribution density of the primary spacers in the distribution change area (CC) is greater than a distribution density of the primary spacers in a central portion of the display area (AA).

18 Claims, 5 Drawing Sheets

(51) Int. Cl.
     *G02F 1/1362*     (2006.01)
     *G02F 1/1345*     (2006.01)

(52) U.S. Cl.
     CPC ........ *G02F 1/1362* (2013.01); *G02F 1/13306* (2013.01); *G02F 1/133514* (2013.01); *G02F 1/133516* (2013.01); *G02F 2001/13396* (2013.01); *G02F 2001/13456* (2013.01); *G02F 2001/133388* (2013.01)

(56) References Cited

FOREIGN PATENT DOCUMENTS

| | | |
|---|---|---|
| CN | 104407460 A | 3/2015 |
| CN | 105182626 A | 12/2015 |
| CN | 204945580 U | 1/2016 |
| JP | H0973093 A | 3/1997 |
| JP | 2010055123 A | 3/2010 |
| JP | 2013250320 A | 12/2013 |
| WO | 2011122076 A1 | 10/2011 |

OTHER PUBLICATIONS

Sep. 30, 2017—(CN) First Office Action Appn 201510673647.5 with English Tran.

* cited by examiner

LIQUID CRYSTAL DISPLAY AND MANUFACTURING METHOD THEREOF

The application is a U.S. National Phase Entry of International Application No. PCT/CN2016/091729 filed on Jul. 26, 2016, designating the United States of America and claiming priority to Chinese Patent Application No. 201510673647.5, filed Oct. 16, 2015. The present application claims priority to and the benefit of the above-identified applications and the above-identified applications are incorporated by reference herein in their entirety.

TECHNICAL FIELD

Embodiments of the present disclosure relate to a liquid crystal display (LCD) and a manufacturing method thereof.

BACKGROUND

In the manufacturing process of an LCD, the entire mother panel is cut into single panel units after a cell-assembly process. As illustrated in FIG. 1, a single panel unit includes an array substrate 1 and a color filter (CF) substrate 2 arranged opposite to each other. One end of the array substrate 1 is exposed and used for bonding a circuit board or circuit boards 3.

FIG. 2 is a sectional view of FIG. 1 along a dotted line PP'. In the bonding process of the circuit board 3, the array substrate 1 makes direct contact with a base table 4, and an anisotropic conductive film (ACF) 5 is adopted to bond the circuit board 3 on a bonding area of the array substrate 1. In the manufacturing process, a high-temperature hot press head 6 is adopted for the hot pressing of the circuit board 3; the ACF 5 is fused by application of heat; and the thermal heat 6 is removed after maintaining for a predetermined time. The ACF 5 is cured, so that the circuit board 3 can be firmly fixed on the array substrate 1.

In the hot pressing process, the heat conducting path is: hot press head 6→circuit board 3→ACF 5→array substrate 1→base table 4. The temperature difference between the hot press head 6 and the base table 4 is large, so that the expansion amount of the circuit board 3 making contact with the hot press head 6 will be greater than the expansion amount of the array substrate 1 making direct contact with the base table 4. Thus, in the subsequent process of curing the ACF 5, the circuit board 3 and the array substrate 1 are cooled, so that the shrinkage amount of the circuit board 3 will be greater than the shrinkage amount of the array substrate 1, and hence the bending or warping of the circuit board 3 and the array substrate 1 as illustrated in FIG. 3 can be produced. The bending will result in the change of the distance between the array substrate 1 and the color filter (CF) substrate 2 at the periphery of the bonding area, so that the display color at the periphery of the bonding area will change to a certain degree. Thus, Mura phenomenon can be caused, and hence the image display quality can be affected.

SUMMARY

The present disclosure provides an LCD and a manufacturing method thereof, which can be used to solve the problem of the bending of the circuit board and the array substrate produced during the bonding of the circuit board.

A first aspect of the present disclosure provides a liquid crystal display (LCD), having a display area and a border area, comprising: an array substrate and a color filter (CF) substrate arranged opposite to each other; and a plurality of primary spacers disposed between the array substrate and the CF substrate. A circuit board is bonded to an edge of the array substrate; the LCD comprises a distribution change area which is disposed at a periphery of the circuit board; and a distribution density of the primary spacers in the distribution change area is greater than a distribution density of the primary spacers in a central portion of the display area.

A second aspect of the present aspect of the present disclosure provides a method for manufacturing a liquid crystal display (LCD), comprising: providing an array substrate and a color filter (CF) substrate; forming a plurality of primary spacers on the array substrate and/or the CF substrate, in which a substrate to which the primary spacers are adhered comprises a distribution change area, and a distribution density of the primary spacers in the distribution change area is greater than a distribution density of the primary spacers in a central portion of the display area; allowing the array substrate and the CF substrate to be cell-assembled together; and bonding a circuit board at an edge of the array substrate, in which the distribution change area is disposed at a periphery of the circuit boards.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

Figure 1:
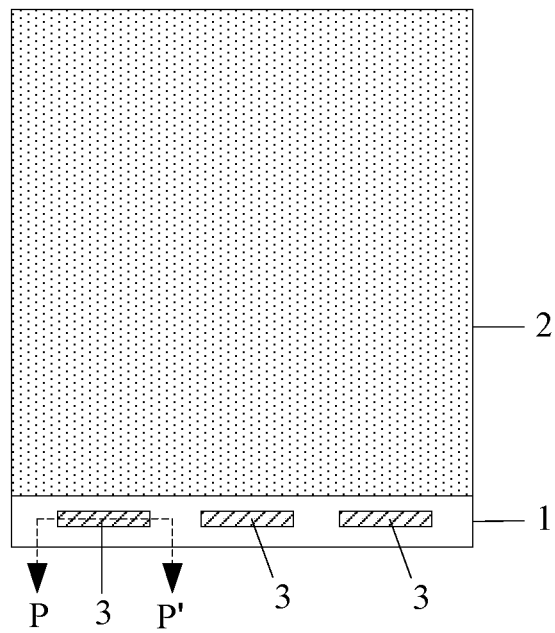
FIG. 1 is a schematic structural plan view of an LCD.
Figure 2:
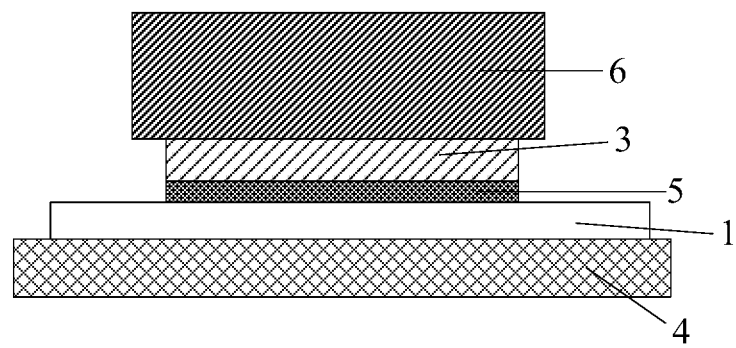
FIG. 2 is a schematic diagram of the LCD in the process of bonding a circuit board.
Figure 3:
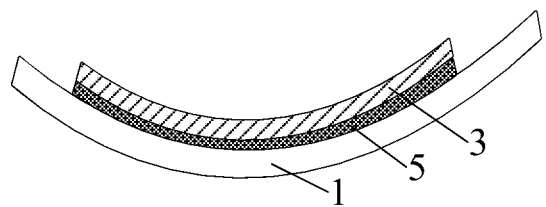
FIG. 3 is a schematic diagram of the LCD obtained after the bonding of the circuit board.

REFERENCE NUMERALS OF THE
ACCOMPANYING DRAWINGS 1-array substrate;
2-CF substrate;
3-circuit board;
4-base;
5-ACF;
6-hot press head;
7-primary spacer;
8-auxiliary spacer;
AA-display area;
BB-border area;
CC-distribution change area.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 4:
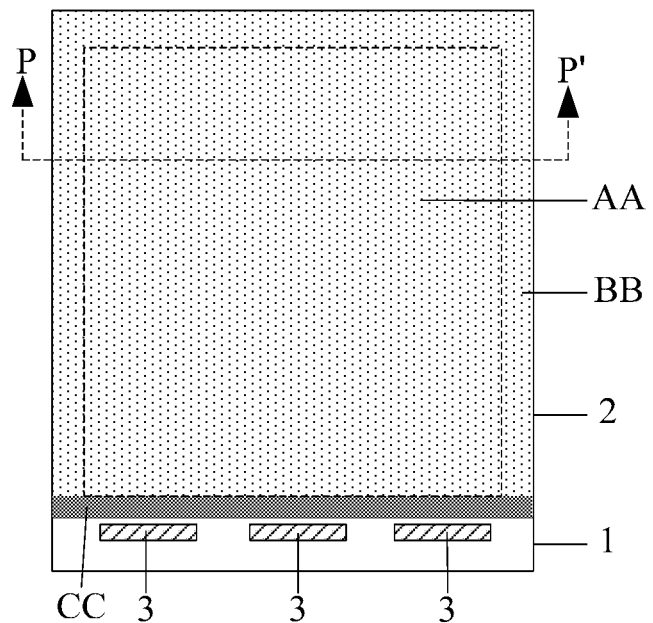
FIG. 4 is a first schematic structural plan view of an LCD provided by an embodiment of the present disclosure.
Figure 5:
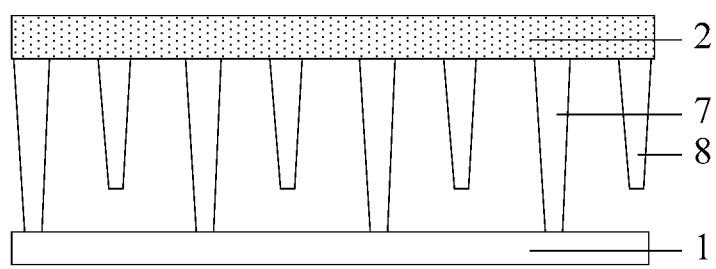
FIG. 5 is a schematic structural sectional view of the LCD provided by the embodiment of the present disclosure.

An embodiment provides an LCD, as illustrated in FIGS. 4 and 5; FIG. 5 is a sectional view of FIG. 4 along a dotted line PP'. The LCD has a display area AA and a border area BB, namely the LCD may be divided into the display area AA and the border area BB. The display area AA is used for display and may include a pixel array. The border area BB is, for instance, arranged around the display area AA.

The LCD comprises an array substrate 1 and a color filter (CF) substrate 2 arranged opposite to each other, and a plurality of primary spacers 7 disposed between the array substrate and the CF substrate. Circuit boards 3 are bonded to an edge of the array substrate 1. The LCD comprises a distribution change area CC which is disposed at the periphery of the circuit boards 3. The distribution density of the primary spacers 7 in the distribution change area CC is greater than the distribution density of the primary spacers in a central portion of the display area AA, namely the number of the primary spacers 7 in the distribution change area CC per unit area is greater than the number of the primary spacers in the central portion of the display area AA. The CF substrate 2 is one example of an opposing substrate and includes a CF layer. When the array substrate includes a CF layer, no CF layer is required to be provided on the opposing substrate. Thus, at this point, the opposing substrate is not a CF substrate.

Correspondingly, the array substrate 1 and the CF substrate 2 include portions disposed in the display area AA and the border area BB. The distribution change area CC may occupy at least part of the border area BB or may occupy at least part of the display area AA and at least part of the border area BB.

In the LCD, the distribution density of the primary spacers 7 in the distribution change area CC is greater than the distribution density of the primary spacers in the central portion of the display area AA. The distribution change area CC is disposed at the periphery of the circuit boards 3. That is to say, the distribution density of the primary spacers 7 in a specific area (namely the distribution change area CC) at the periphery of the circuit boards 3 is greater than the distribution density of the primary spacers in the central portion of the display area AA.

In a design of an LCD, the distribution of the primary spacers in the LCD is uniform, namely the distribution density of the primary spacers at the periphery of the circuit boards is equal to the distribution density of the primary spacers in the central portion of the display area. Moreover, the distribution density of the primary spacers in the LCD in the central portion of the display area is fixed. The distribution density of the primary spacers in the present disclosure in the central portion of the display area may be the same as the design. Therefore, the distribution density of the primary spacers 7 in the present disclosure in the specific area at the periphery of the circuit boards 3 will be increased compared with the above-described design.

Because the primary spacers 7 abut against the array substrate 1 or are fixed on the array substrate 1, in the bonding process of the circuit boards 3, if the circuit boards 3 and the array substrate 1 are bent, the primary spacers at the periphery of the circuit boards 3 can apply a supporting force opposite to the bending direction to the bent array substrate 1. The embodiment of the present disclosure increases the number of the primary spacers 7 at the periphery of the circuit boards 3 by increasing the distribution density of the primary spacers 7 in the specific area at the periphery of the circuit boards 3, increases the supporting force opposite to the bending direction applied to the bent array substrate 1 by the primary spacers 7 at the periphery of the circuit boards 3, and hence can prevent the bending of the array substrate 1 to a great extent. Because the circuit boards 3 are bonded to the array substrate 1, the bending of the circuit boards 3 can also be avoided. Thus, the Mura phenomenon caused by the bending of the circuit boards 3 and the array substrate 1 can be eliminated or alleviated, and hence the image display quality can be improved.

With reference to FIG. 5 again, the LCD provided by an embodiment not only comprises the primary spacers 7 but also may comprise a plurality of auxiliary spacers 8. The heights of the auxiliary spacers 8 in the central portion of the display area AA are less than the heights of the primary spacers 7. As illustrated in the drawing, in the embodiment, both the auxiliary spacers 8 and the primary spacers 7 are formed on the CF substrate 2. Thus, the heights of the auxiliary spacers 8 on the CF substrate are less than the heights of the primary spacers 7. When the LCD is not pressed, there is a certain gap between the top of the auxiliary spacer 8 and the array substrate 1, and the top of the primary spacer 7 abuts against the array substrate 1. Therefore, when the LCD is pressed, the auxiliary spacers provide a supporting force for the LCD together with the primary spacers 7, so that the compressive strength of the LCD can be improved, and meanwhile, certain fluctuation amount of liquid crystals in a liquid crystal cell can be maintained.

The heights of the auxiliary spacers 8 in the distribution change area CC may also be less than the heights of the primary spacers 7. On the premise of this, there are the following cases:

(1) The heights of the auxiliary spacers 8 in the distribution change area CC may be greater than the heights of the auxiliary spacers 8 in the central portion of the display area AA, so that the supporting strength of the auxiliary spacers in the distribution change area CC on the array substrate 1 can be improved, and hence the bending of the array substrate 1 and the circuit boards 3 can be further prevented.

(2) Projections may be formed on a substrate opposite to a substrate (the CF substrate 2 or the array substrate 1) to which the auxiliary spacers 8 are adhered, in the distribution change area CC. The projections abut against the auxiliary spacers 8, so as to make up for the heights of the auxiliary spacers 8 and increase the supporting force of the auxiliary spacers in the distribution change area CC on the array substrate, and hence the bending of the array substrate 1 and the circuit boards 3 can be further prevented.

(3) The heights of the auxiliary spacers 8 in the distribution change area CC may be equal to the heights of the auxiliary spacers 8 in the central portion of the display area AA, so that the auxiliary spacers 8 in various areas of the LCD can be synchronously formed, and hence the processing steps can be reduced.

The heights of the auxiliary spacers 8 in the distribution change area CC may also be equal to the heights of the primary spacers 7, so that the supporting strength of the spacers in the distribution change area CC on the array substrate 1 can be improved to a great extent.

In order to further improve the supporting strength of the spacers in the distribution change area CC on the array substrate 1 and avoid the bending of the array substrate 1 and the circuit boards 3, the heights of the auxiliary spacers 8 in the distribution change area CC may be gradually reduced in the directions which are radiated outwards by taking the primary spacers 7 as centers, so that the heights of the spacers can be gradually reduced towards the periphery by taking the primary spacers 7 as the centers. Thus, a large buffer action is provided when the LCD is pressed, and hence the supporting strength of the spacers on the array substrate 1 can be improved.

In order to further improve the supporting strength of the spacers in the distribution change area CC on the array substrate 1 and prevent the bending of the array substrate 1 and the circuit boards 3, in the distribution change area CC, the distribution density of the primary spacers and/or the auxiliary spacers 8 may be gradually increased in the direction from the display area AA to the circuit boards 3, so that the supporting force provided by the spacers in the area closer to the circuit boards 3 is larger. Moreover, the change of the supporting force is subjected to gradual transition, so that the supporting strength of the spacers on the array substrate can be improved. In addition, in the distribution change area CC, the heights of the primary spacers 7 and/or the auxiliary spacers 8 may also be gradually increased in the direction from the display area AA to the circuit boards 3, so that the supporting strength of the spacers on the array substrate 1 can be improved.

In order to further improve the supporting strength of the spacers in the distribution change area CC on the array substrate 1 and prevent the bending of the array substrate 1 and the circuit boards 3, the area size of the top of the primary spacer 7 in the distribution change area CC is greater than or equal to the area size of the top of the primary spacer 7 in the central portion of the display area AA. The objective of improving the supporting strength of the primary spacer 7 in the area can be achieved by increasing the area size of the top of the primary spacer 7 in the distribution change area CC. Similarly, the supporting strength of the auxiliary spacer 8 may be improved by increasing the area size of the top of the auxiliary spacer 8 in the distribution change area CC. As for the above technical proposal, more specifically, the primary spacers 7 and the auxiliary spacers 8 in the distribution change area CC may adopt cylindrical shape, and the primary spacers 7 and the auxiliary spacers 8 in the central portion of the display AA may adopt conical shape.

In order to further improve the supporting strength of the spacers in the distribution change area CC on the array substrate 1 and prevent the bending of the array substrate 1 and the circuit boards 3, materials with high hardness may be adopted or the technical means of doping materials with high hardness into a base materials may be adopted to manufacture the primary spacers 7 and the auxiliary spacers 8 in the distribution change area CC.

In the embodiment, specifically, the region covered by the area with high distribution density of the primary spacers 7 (namely the distribution change area CC) is not limited. Several examples are given below:

(1) Continuing to refer to FIG. 4, the distribution change area CC may cover a part of the border area BB disposed on the side provided with the circuit boards 3, so as to fully increase the supporting force of the primary spacers 7 at the periphery of the circuit boards 3.

Figure 6:
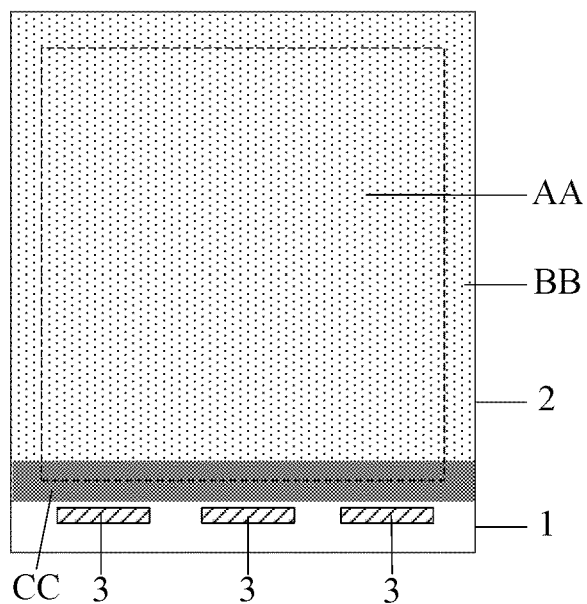
FIG. 6 is a second schematic structural plan view of the LCD provided by an embodiment of the present disclosure.

(2) Based on the first example, as illustrated in FIG. 6, the distribution change area CC may cover the part of the border area BB disposed on the side provided with the circuit boards 3, and a part of an edge portion of the display area AA disposed on the side provided with the circuit boards 3, so as to further increase the number of the primary spacers 7 at the periphery of the circuit boards 3 and improve the supporting strength of the primary spacers 7 at the periphery of the circuit boards 3.

Figure 7:
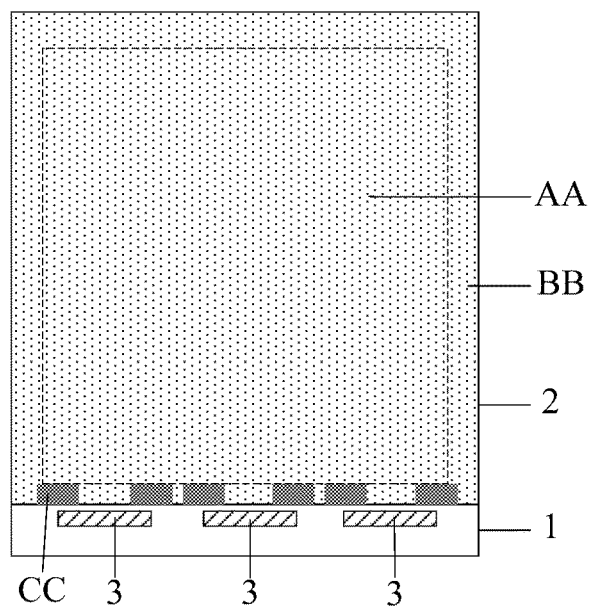
FIG. 7 is a third schematic structural plan view of the LCD provided by an embodiment of the present disclosure.

(3) As illustrated in FIG. 7, because the force moment of the supporting force opposite to the bending direction applied to the periphery on both ends of the circuit board 3 is larger than the force moment of the supporting force opposite to the bending direction applied to the periphery at the middle of the circuit board 3, the application of the supporting force opposite to the bending direction on the periphery on both ends of the circuit board 3 plays a more significant role in preventing the bending of the circuit boards 3 and the array substrate 1. Therefore, in the LCD provided by the embodiment, the distribution change area CC is preferably disposed at the periphery on both ends of the circuit boards 3. That is to say, the distribution density of the primary spacers 7 at the periphery on both ends of the circuit boards 3 can be increased, so that the number of the added primary spacers 7 can be reduced but the effect of improving the bending effect will not be disadvantageously affected.

Figure 8:
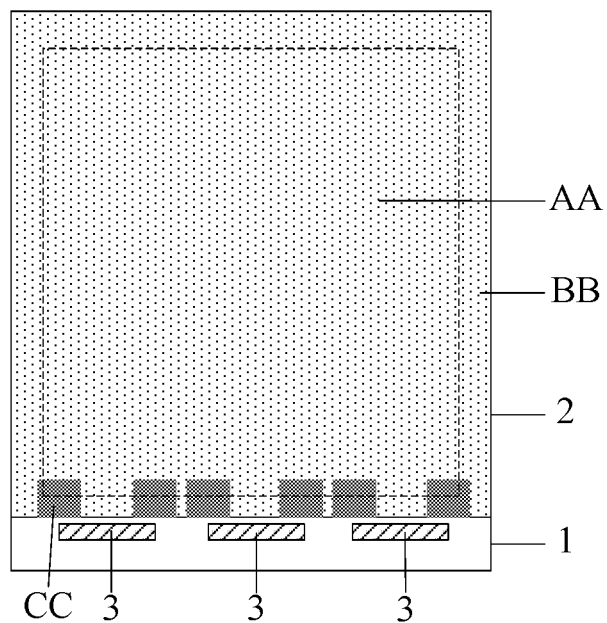
FIG. 8 is a fourth schematic structural plan view of the LCD provided by an embodiment of the present disclosure.

(4) Based on the third example, as illustrated in FIG. 8, the distribution change area CC may be extended to the edge portion of the display area AA, so as to further improve the supporting strength of the primary spacers 7 at the periphery of the circuit boards 3.

Figure 9:
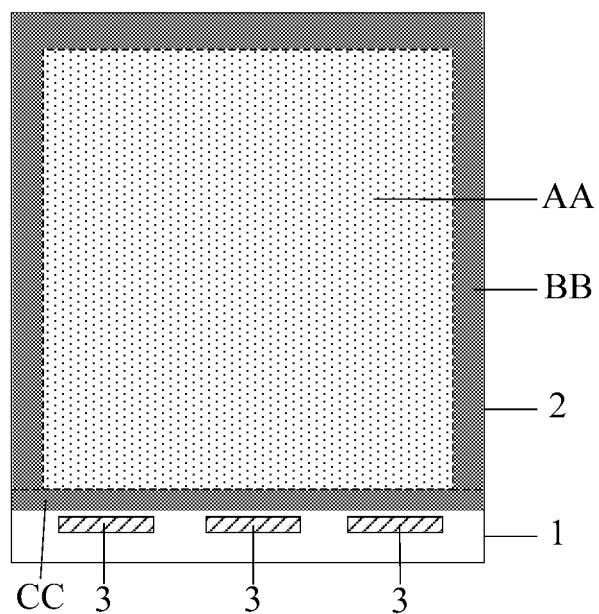
FIG. 9 is a fifth schematic structural plan view of the LCD provided by an embodiment of the present disclosure.
Figure 10:
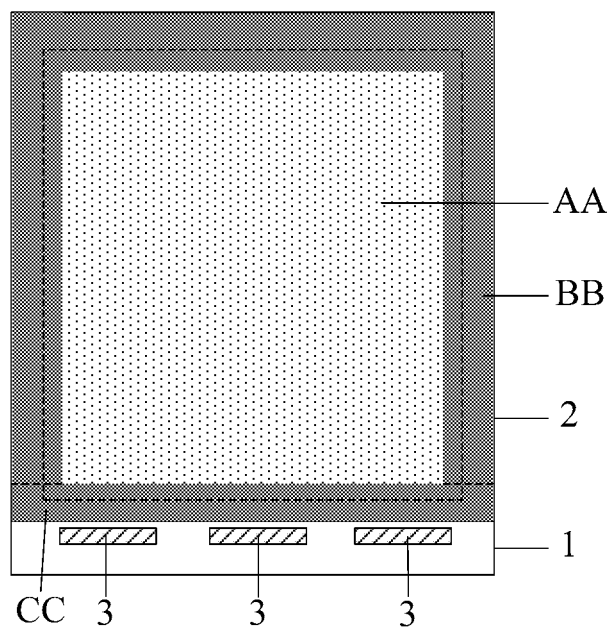
FIG. 10 is a sixth schematic structural plan view of the LCD provided by an embodiment of the present disclosure.

(5) As illustrated in FIG. 9, if the distribution change area CC covers the part of the border area BB disposed on the side provided with the circuit boards 3, in order to obtain uniform supporting strength at various positions in the border area BB, the distribution density of the primary spacers 7 in the entire border area BB may be preferably increased.

(6) Based on the fifth example, if the distribution change area CC covers the part of the border area BB disposed on the side provided with the circuit boards 3, and the part of the edge portion of the display area AA disposed on the side provided with the circuit boards 3, in order to obtain uniform supporting strength at various positions in the border area BB and the edge portion of the display area AA, the distribution density of the primary spacers 7 in the entire border area BB and the entire edge portion of the display area AA may be preferably increased.

In the embodiment, the primary spacers 7 may be uniformly distributed in the central portion of the display area AA, so as to provide uniform supporting force for the LCD.

The setting mode of the primary spacers 7 is not limited in the embodiments. The bottom of a primary spacer 7 may be fixed on the CF substrate 2, and the top of the primary spacer abuts against the array substrate 1; or the bottom of a primary spacer 7 is fixed on the array substrate 1, and the top of the primary spacer abuts against the CF substrate 2.

It should be noted that the LCD provided by the embodiment is applicable to any product or component with display function such as a TV, a display, a movie screen, a mobile phone, a tablet PC, a notebook computer, a digital picture frame, a navigator or the like.

Based on any LCD provided by the above technical proposals, the embodiment further provides a method for manufacturing the LCD. The manufacturing method comprises the following steps:

S1: providing an array substrate 1 and a CF substrate 2. The array substrate 1 and the CF substrate 2 may be respectively manufactured.

S2: forming a plurality of primary spacers 7 on the array substrate 1 and/or the CF substrate 2, in which a substrate to which the primary spacers 7 are adhered has a distribution change area CC, and the distribution density of the primary spacers 7 in the distribution change area CC is greater than the distribution density of the primary spacers in a central portion of a display area AA.

In the step, the primary spacers 7 may be formed by a patterning process. As for an LCD simultaneously provided with the primary spacers 7 and auxiliary spacers 8, the primary spacers 7 and the auxiliary spacers 8 may be respectively formed by two patterning processes.

S3: allowing the array substrate 1 and the CF substrate 2 to be cell-assembled together.

In the step, the array substrate 1 and the CF substrate 2 are cell-assembled by sealant, and liquid crystals are injected into a liquid crystal cell formed by cell-assembly.

S4: bonding circuit boards 3 at an edge of the array substrate 1, in which the distribution change area CC is disposed at the periphery of the circuit boards 3.

In the step, as the distribution change area CC is disposed at the periphery of the circuit boards 3, the distribution density of the primary spacers 7 in the distribution change area CC is greater than the distribution density of the primary spacers in the central portion of the display area AA. Therefore, it is equivalent to increase the distribution density of the primary spacers 7 in a specific area at the periphery of the circuit boards 3, so that the supporting force opposite to the bending direction applied to the bent array substrate 1 by the primary spacers 7 at the periphery of the circuit boards 3 can be increased, and hence the bending of the array substrate 1 and the circuit boards 3 can be prevented to a great extent. Thus, the Mura phenomenon caused by the bending of the circuit boards 3 and the array substrate 1 can be eliminated, and hence the image display quality can be improved.

What are described above is related to the illustrative embodiments of the disclosure only and not limitative to the scope of the disclosure; the scopes of the disclosure are defined by the accompanying claims.

The application claims priority to the Chinese patent application No. 201510673647.5, filed Oct. 16, 2015, the entire disclosure of which is incorporated herein by reference as part of the present application.

What is claimed is:

1. A liquid crystal display (LCD), having a display area and a border area, comprising:
    an array substrate and a color filter (CF) substrate arranged opposite to each other; and
    a plurality of primary spacers disposed between the array substrate and the CF substrate, wherein
    a circuit board is bonded to a first edge of the array substrate; the LCD comprises a distribution change area which is only disposed at a periphery of the circuit board that is bonded to the first edge of the array substrate; and a distribution density of the primary spacers in the distribution change area is greater than a distribution density of the primary spacers in a central portion of the display area.

2. The LCD according to claim 1, further comprising: a plurality of auxiliary spacers disposed between the array substrate and the CF substrate, wherein
    heights of the auxiliary spacers in the distribution change area are less than or equal to heights of the primary spacers, and heights of the auxiliary spacers in the distribution change area are greater than heights of the auxiliary spacers in the central portion of the display area.

3. The LCD according to claim 2, wherein the heights of the auxiliary spacers are gradually reduced in the distribution change area in directions which are radiated outwards by taking the primary spacers as centers.

4. The LCD according to claim 1, further comprising: a plurality of auxiliary spacers disposed between the array substrate and the CF substrate, wherein
    heights of the auxiliary spacers in the distribution change area are less than heights of the primary spacers; and projections are formed on one of the array substrate and the CF substrate, opposite to the other of the array substrate and the CF substrate, to which the auxiliary spacers are adhered, in the distribution change area; and the projections abut against the auxiliary spacers respectively.

5. The LCD according to claim 1, wherein an area size of a top of each primary spacer in the distribution change area is greater than or equal to an area size of a top of each primary spacer in the central portion of the display area.

6. The LCD according to claim 1, wherein the distribution change area is disposed at the periphery on both ends of the circuit board.

7. The LCD according to claim 1, wherein the distribution change area covers a part of the border area disposed on a side provided with the circuit board; or
    the distribution change area covers the part of the border area disposed on the side provided with the circuit board and a part of an edge portion of the display area disposed on the side provided with the circuit board.

8. The LCD according to claim 1, wherein the primary spacers are uniformly distributed in the central portion of the display area.

9. The LCD according to claim 1, wherein bottoms of the primary spacers are fixed on the CF substrate, and tops of the primary spacers abut against the array substrate; or
the bottoms of the primary spacers are fixed on the array substrate, and the tops of the primary spacers abut against the CF substrate.

10. A method for manufacturing a liquid crystal display (LCD), comprising:
providing an array substrate and a color filter (CF) substrate;
forming a plurality of primary spacers on the array substrate and/or the CF substrate, in which one of the array substrate and the CF substrate to which the primary spacers are adhered comprises a distribution change area, and a distribution density of the primary spacers in the distribution change area is greater than a distribution density of the primary spacers in a central portion of the display area;
allowing the array substrate and the CF substrate to be cell-assembled together; and
bonding a circuit board at a first edge of the array substrate, in which the distribution change area is only disposed at a periphery of the circuit board that is bonded to the first edge of the array substrate.

11. The LCD according to claim 2, wherein the distribution change area is disposed at the periphery on both ends of the circuit board.

12. The LCD according to claim 2, wherein the distribution change area covers a part of the border area disposed on a side provided with the circuit board; or
the distribution change area covers the part of the border area disposed on the side provided with the circuit board and a part of an edge portion of the display area disposed on the side provided with the circuit board.

13. The LCD according to claim 2, wherein the primary spacers are uniformly distributed in the central portion of the display area.

14. The LCD according to claim 2, wherein bottoms of the primary spacers are fixed on the CF substrate, and tops of the primary spacers abut against the array substrate; or
the bottoms of the primary spacers are fixed on the array substrate, and the tops of the primary spacers abut against the CF substrate.

15. The LCD according to claim 4, wherein the distribution change area is disposed at the periphery on both ends of the circuit board.

16. The LCD according to claim 4, wherein the distribution change area covers a part of the border area disposed on a side provided with the circuit board; or
the distribution change area covers the part of the border area disposed on the side provided with the circuit board and a part of an edge portion of the display area disposed on the side provided with the circuit board.

17. The LCD according to claim 4, wherein the primary spacers are uniformly distributed in the central portion of the display area.

18. The LCD according to claim 4, wherein bottoms of the primary spacers are fixed on the CF substrate, and tops of the primary spacers abut against the array substrate; or
the bottoms of the primary spacers are fixed on the array substrate, and the tops of the primary spacers abut against the CF substrate.

* * * * *